INVENTOR.
EUGENE H. HANDLER
BY
Birch & Birch

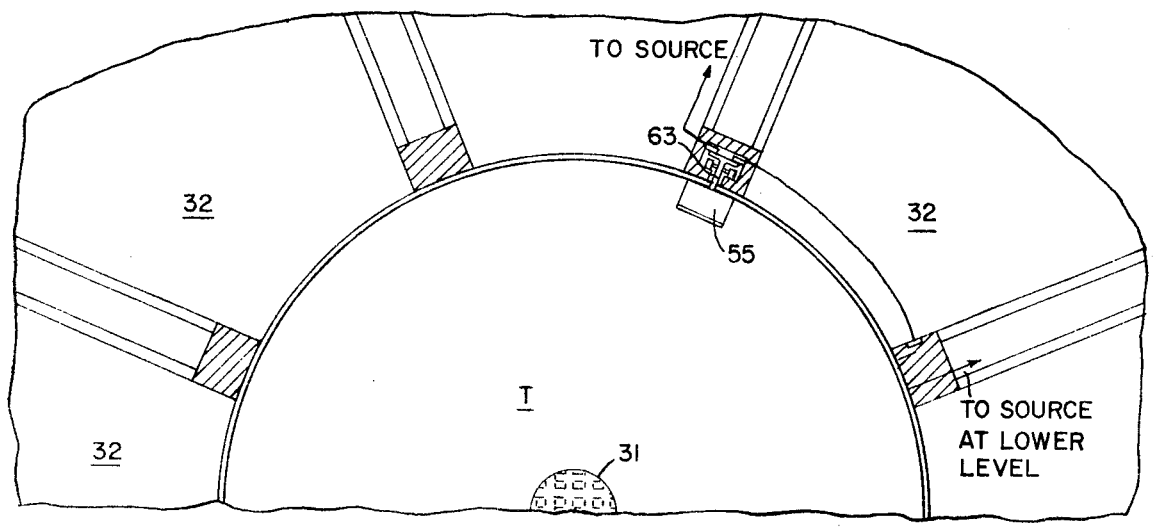
FIG. 4
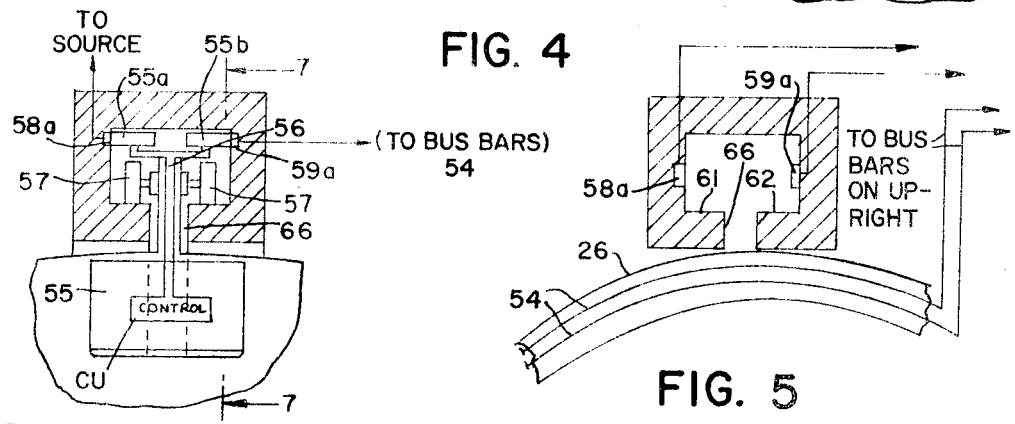
FIG. 6
FIG. 5
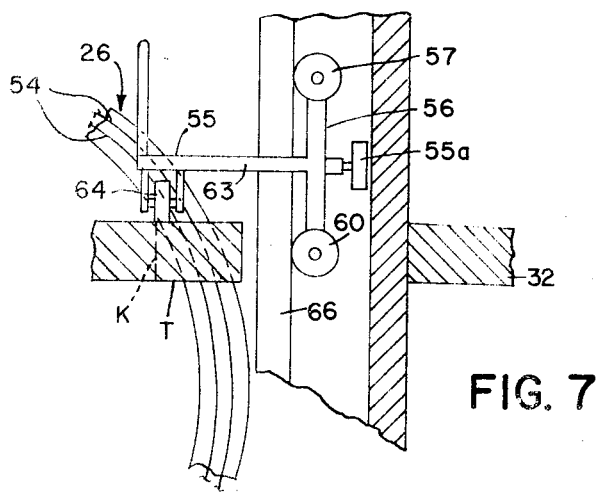
FIG. 7

May 26, 1970  E. H. HANDLER  3,513,992
SPIRAL STORAGE STRUCTURE AND SYSTEM FOR PARKING VEHICLES
Filed March 8, 1968  6 Sheets-Sheet 5

INVENTOR.
EUGENE H. HANDLER
BY
Birch & Birch

INVENTOR.
EUGENE H. HANDLER

United States Patent Office 3,513,992
Patented May 26, 1970

3,513,992
SPIRAL STORAGE STRUCTURE AND SYSTEM FOR PARKING VEHICLES
Eugene H. Handler, 4217 Brookfield Drive, Kensington, Md. 20795
Filed Mar. 8, 1968, Ser. No. 712,035
Int. Cl. E04h 6/06
U.S. Cl. 214—16.1    3 Claims

ABSTRACT OF THE DISCLOSURE

A storage structure for automobiles having a central open area defined by a spiral track for a power driven turntable adapted to revolve and travel up and down the spiral track in the open area into position for transfer of vehicles to and from the turntable at selected parking areas at spirally stepped elevations around the open area. The turntable has track wheels and the storage structure has the respective parking areas at stepped spiral elevations starting at ground level around the track arranged to register with the periphery of the turntable at various vehicle parking elevations and includes automatically controlled transfer means on the turntable for transferring the vehicles from the turntable onto one of the parking areas and retrieving it from the parking area to the turntable and returning the car to its driver.

---

The present invention relates to vehicle parking systems and more particularly to a novel structure having spiral stepped multi-level parking cells arranged radially around an open central area vertically extending from ground level, each parking area having an entrance for cooperative registry with a suitable vehicle hoist or elevator means, to thereby mechanically permit transfer of vehicles to and from the hoist or elevator means to any of the respective parking cells selected.

An object of this invention is to provide a novel parking structure with radial parking areas arranged in predetermined circular fashion around a central open space enshrouded by a helical track or rail on which a turntable travels and onto which turntable a vehicle may be driven for transportation to any one of the entrance portions of a selected parking cell with the entrance thereof radially facing the outer periphery of the turntable as it becomes turned into cooperative positions.

Another object of this invention is to provide novel power means for driving the respective track engaging wheels of the turntable, whereby an operator at will can raise and lower the turntable to bring vehicles parked on the turntable into positions for transfer to adjacent parking cells at selected parking levels of the parking structure.

Yet another object is to provide transfer means on the turntable for mechanical transfer of a driverless vehicle thereon to selected parking cells.

Another object is to provide a novel building structure for use in relatively small lots or adjacent internal or external to existing relatively larger building structures, whereby normally unusable space may be utilized with optimum results.

Still another object is to provide a novel building structure for parking vehicles with a minimum need for operating attendants, whereby the owner of the vehicle, when parking his vehicle in the building turntable means, is the sole driver of his vehicle for each parking operation, which actual transfer to a parking cell is accomplished solely with the turntable and the associated transfer means.

With these and other objects in view, the present novel parking structure consists in the novel construction, arrangement and combination of parts described in the following specification and illustrated in the accompanying drawings, wherein several forms of construction of the parts of the structure are depicted.

In the drawings, wherein like parts are referred to by like characters throughout:

FIG. 4 is a top plan view of another embodiment including the turntable and a transverse section view taken through the structural supports, including an illustration of the mounting of an attendant platform adapted for vertical non-rotative travel with the turntable;

FIG. 5 is a transverse cross section view taken through a vertical support beam having an elongated slot to permit vertical and non-rotatable movement of the attendant platform embodiment in combination with the up and down rotary travel of the turntable and showing the energized spaced track segments used with this embodiment;

FIG. 6 is a similar view to FIG. 5 with the attendant platform connections mounted therein above the peripheral top surface of the supporting turntable and showing a control unit and bus bar connections diagrammatically;

FIG. 7 is a longitudinal section view taken along section line 7—7 of FIG. 6 including a portion of a segment of track for the turntable;

Figure 1:
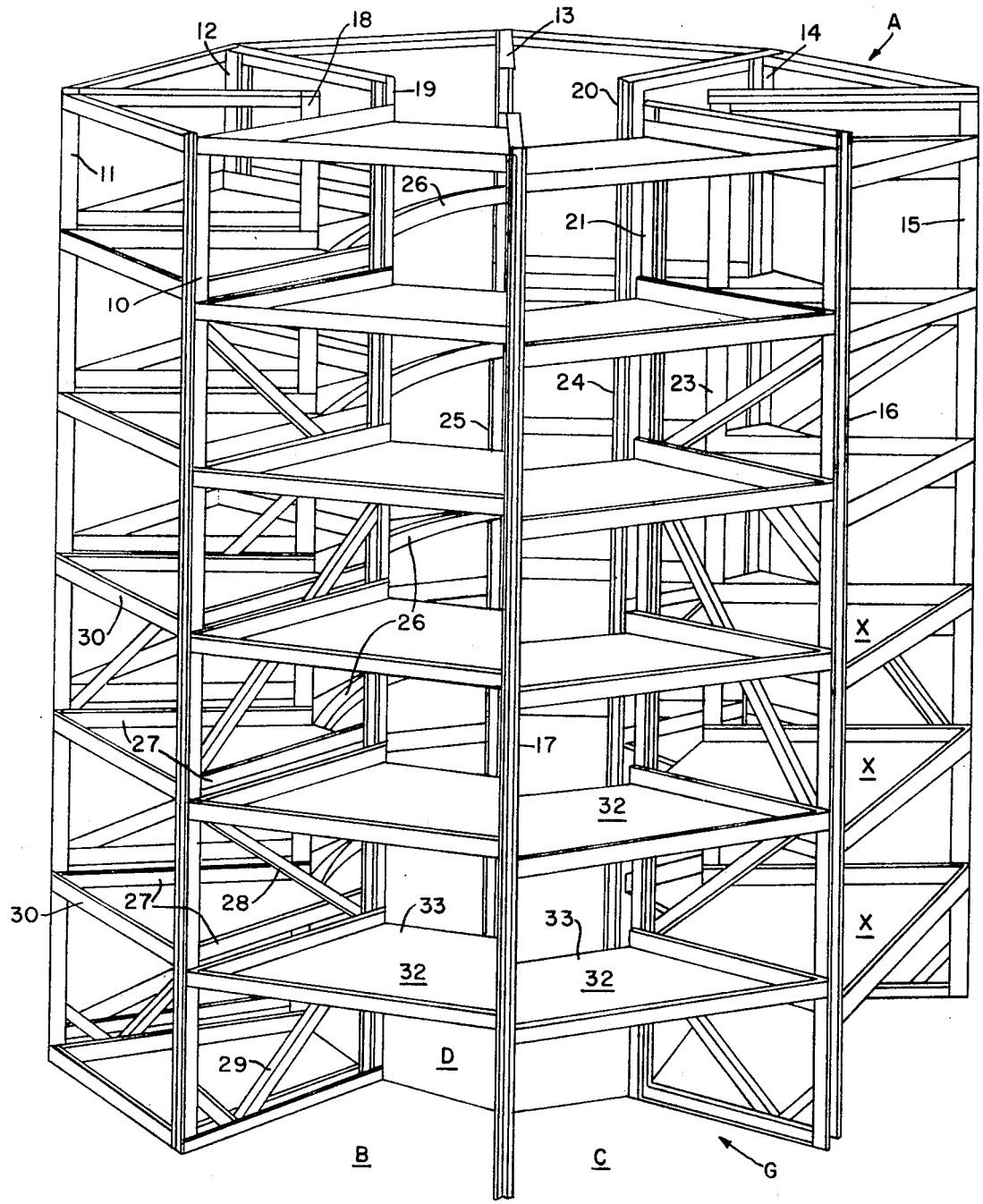
FIG. 1 is a side view in perspective of an open framework construction of the present invention with the turntable means removed and illustrating the spiral step arrangement of the multi-level parking surfaces of the parking areas or cells.
Figure 2:
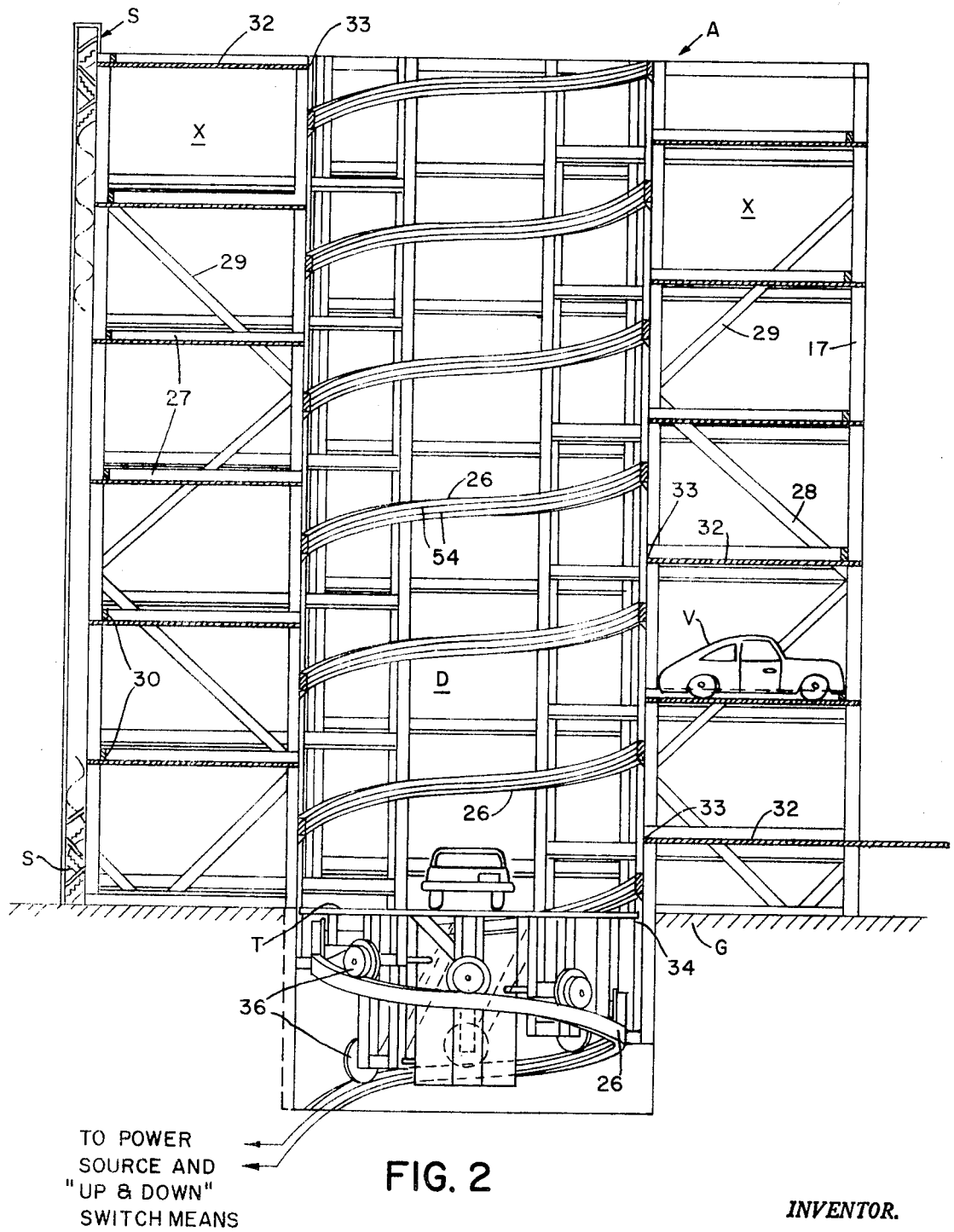
FIG. 2 is a similar view to FIG. 1 with the turntable shown in side elevation on the spiral track portion of the structure and showing a parked vehicle in one of the parking cells and with another in the process of being transported for transfer to a cell at another stepped parking level.
Figure 3:
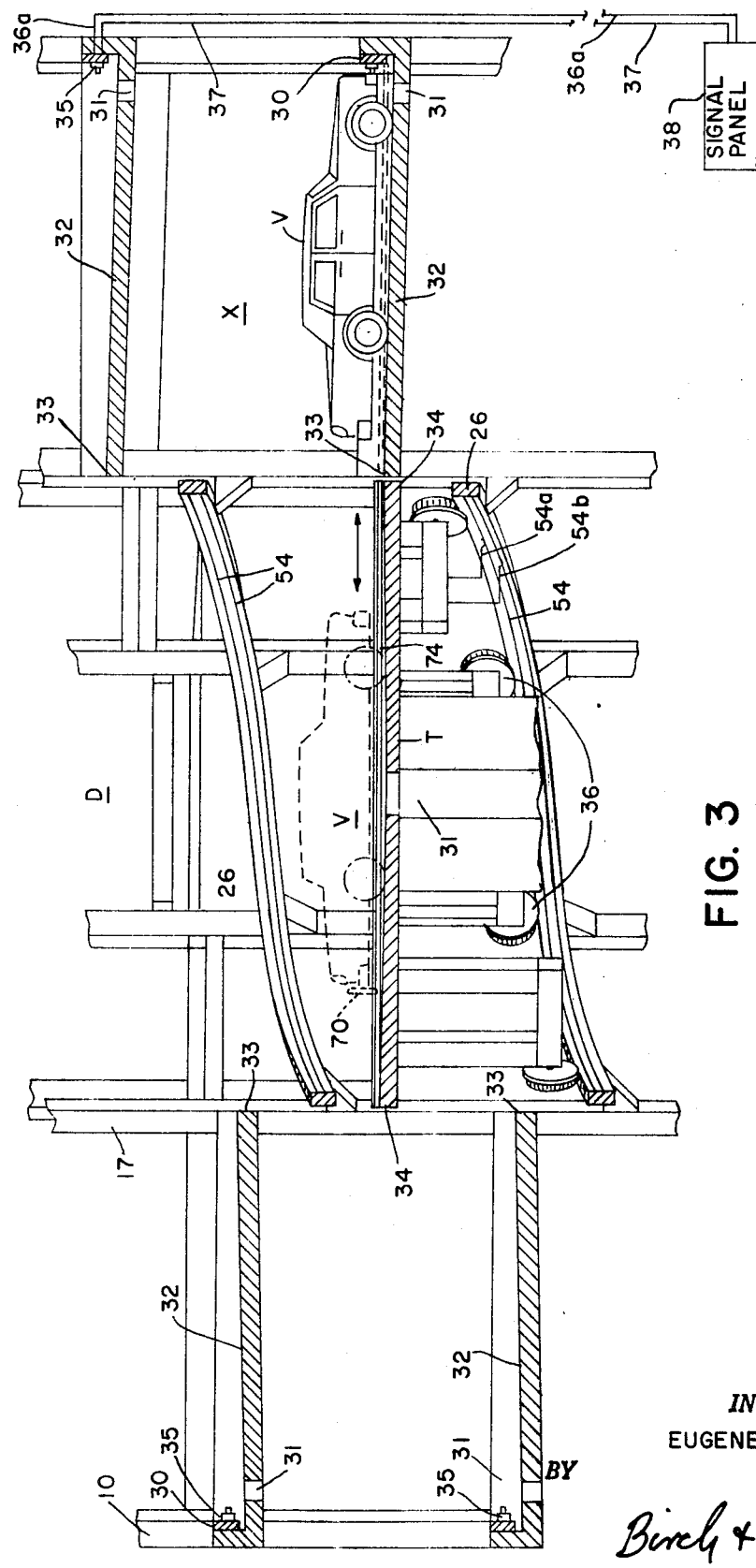
FIG. 3 is an enlarged sectional view taken through a central section of the structure to illustrate the spiral rail mounting and the turntable and track wheels engaged with the track, so the turntable is positioned in proper registry at a vehicle transfer level for parking or retrieve position from the surface level of a parking cell.

Referring in detail to the drawings, and first with particular reference to FIGS. 1, 2 and 3, there is shown a skeleton structure A which may, if desired, be provided with a roof and closed side walls. However, for clarity of description, the device is disclosed in skeleton form and, in fact, it may be preferable in the interest of economy in many instances not to provide a roof or side portions for the structure. Also, as shown in FIG. 2, there is provided an auxiliary stairway S to be used if needed.

In the structure A, the same is formed as a multi-level structure having ground level entrances, such, for example, as B and C. Also, the structure A may either be circular or polygonal in form. For example, if shaped as a regular polygon, as shown, it may have eight sides each bounded or framed by outer or outboard vertical beams 10, 11, 12, 13, 14, 15, 16 and 17. These outboard beams are transversely spaced forwardly of a plurality of similar beams 18, 19, 20, 21, 22, 23, 24 and 25 positioned so as to define a central open area at the core and serve as the vertical supports for a spiral track or rail means 26 positioned at the center or core D of the structure. This spiral track extends vertically upward from below ground level G to the uppermost portion of the structure A, see FIG. 2. Also, as illustrated, the inner or inboard vertical beams 18–25 are positioned in relatively closer relation to each other than the outboard vertical beams in the provision of a polygon frame structure, particularly since the exterior and interior beams are connected by spaced horizontal cross bars generally referenced 27 and angular brace bars 28 and 29 connected between the respective cross bars 27 of adjacent level of the structure. In addition to the horizontal inner and outer beam cross bar connectors, are outboard cross members 30 positioned between each spaced pair of outboard beams 10–17. These outer cross members 30 are best shown in FIG. 1 and 3 and are made sufficiently wide to serve as vertical stops to be engaged by the bumper or wheels of any vehicle parked in one of the parking cells X of the structure, which cells are hereinafter described.

Each parking cell X comprises a vehicle supporting platform or floor 32, which floors are arranged in stepped formation in the manner of a spiral stairway, so as to have the edge 33 of each platform arranged to register with the peripheral edge 34 of a turntable T at various selected levels of the parking structure, see FIG. 3. Also, the floor of each cell is slanted from the periphery of the turntable T and includes a drain suitably connected to carry off any foreign matter, such as water, oil, etc.

The turntable T is provided with a suitable undercarriage with wheels such as generally numbered 36 arranged at different stepped elevations to contact peripherally with the annular curved surface of track 26.

To compensate and provide for the proper level registry of the turntable T surface 37 with each respective parking cell surface level when a vehicle transfer is desired, and to permit the turntable freedom of vertical movement, the spiral track and supports therefor are suitably positioned to receive the turntable undercarriage wheels, and permit close vehicle transfer relationship between the selected cell floor edge 33 and the adjacent peripheral edge 34 of the turntable T. Also, each cell floor surface is sloped away from the turntable area to a drain means.

The undercarriage wheels may be smooth surfaced, rubber covered, or formed with cog teeth. When formed as cog wheels the upper track surface is formed with teeth for mating with those of the turntable cog wheels, see FIG. 3.

Also, the undercarriage wheels are preferably arranged to extend slightly within the peripheral edge 34 of the turntable T, so the table will clear the track sections as it goes up and down the central vertical opening D at the core of the structure A, and have close registry with the floor edges 33 of the cells X.

The system may include suitable electrical means to transmit a signal to the ground level when a vehicle is transferred to a parking cell. This may be accomplished by any suitable switch, such as normally open microswitches 35 mounted on the stop bar at the end of the cell when it is contacted and pushed against the action of a suitable biasing spring to close a transmitting circuit comprised of leads 36a and 37 therefrom to a signal light or bell, chime, etc., on a signal panel 38 at, for example, the ground level entrance, see FIG. 3. Thus, an atendant, stationed at ground level, will be appraised by the signal panel of the fact that a vehicle has been properly positioned in a parking cell, whereupon he may energize the driving motor of the turntable, as is well known in the elevator art, and raise or lower the same to another level, to either pick up a parked car or to return to ground level to pick up another car to be raised into alignment with another parking cell. Also, the microswitch means and the connected signal panel 38 will indicate which cells are empty and which are occupied.

Figure 9:
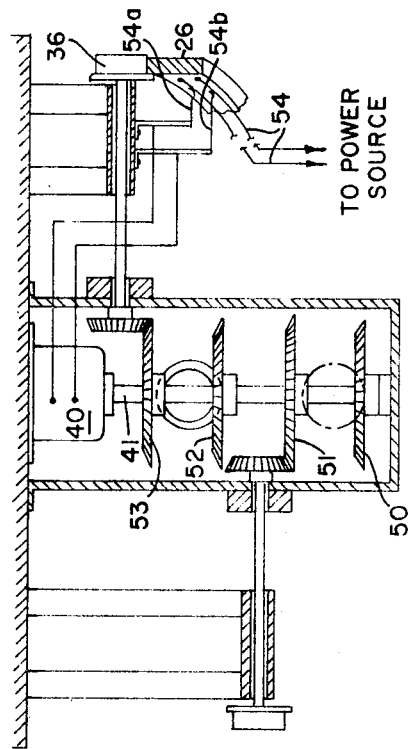
FIG. 9 is a side cross section view of one form of undercarriage drive means on line 9—9 of FIG. 8 for the turntable hoist device as it appears from the underside thereof and a diagrammatic illustration of an electric circuit to drive the turntable motor from trolley means or bus bars on the track.
Figure 8:
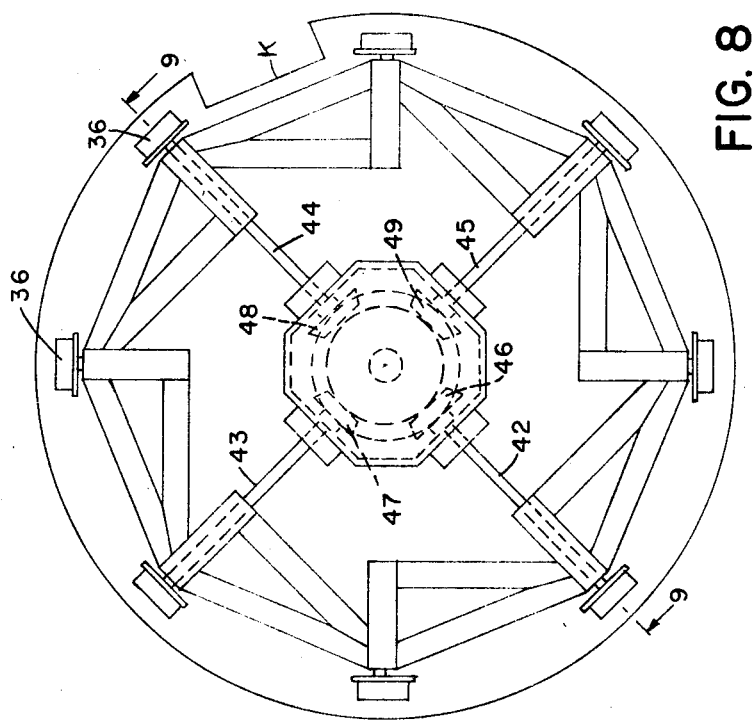
FIG. 8 is a plan view of the turntable with the undercarriage structure including the drive connections of the track engaging wheels.

The undercarriage drive may be of any suitable type, for example, see FIGS. 8 and 9. The arrangement illustrated shows the turntable drive as comprising an electric motor 40 having its rotor shaft 41 connected to radially positioned driven shafts 42, 43, 44 and 45 by bevel gears 46, 47, 48 and 49 with the wheels 36 suitably keyed to the ends of the driven shafts and in driving connection with the spiral rail or track 26, see FIG. 2. The bevel gears 46–49 are each in mesh with main gears 50, 51, 52 and 53 fixed on the drive shaft 41 driven by motor 40.

The turntable elevator motor 40 may be connected through power leads and brush means 54a and 54b to spaced electric trolley means, such as bus bars 54 spirally mounted around the inner face of the track 26. The electric current in the bus bars and to the hoist motor 40 is suitably controlled by suitable motor reversible switch means, so as to provide power to raise and lower the turntable in proper cell registry as is well known in the elevator art, see FIGS. 2, 6 and 9.

The hoist table T, which rotates as it progresses up or down the helix provided by the segmented helical track 26, is formed with a peripheral cut-out portion K. This portion K is in the nature of a key slot and receives portions of the track helix as it goes up or down the shaft or core space D. Thus, the helical track 26 and peripheral slot K function as a large screw guide means and the helical track may be either a left or a right hand helix, as desired, see FIGS. 7 and 8.

Another embodiment of the system may be provided for local control when remote ground level control is not used. This embodiment is shown in FIGS. 4, 5, 6 and 7 and includes an attendant's and operator's platform 55 mounted on a vertically travelling trolley 56.

In reference to the embodiment of FIGS. 5, 6 and 7, the operator's platform 55 mounted on the vertically travelling trolley 56 comprises vertically spaced sets of trolley wheels 57 and 60 adapted to engage the internal surfaces of flanges 61 and 62, of one of the interior vertical beams of the structure A formed with a guide way for the trolley 56. From the trolley and the wheel mount extends a support shaft 63 to the platform 55 and under the outer underside of this platform is a support roller 64 in contact with the top peripheral surface of the turntable T.

In operation, when the turntable T is energized from platform control unit CU to travel up or down the spiral track 26, it likewise carries with it the platform 55 and the trolley wheels ride along the flanges 61 and 62 on each side of the slot 66 on the interior of the beam to which the same is mounted. As the turntable T revolves, the platform 55 does not rotate because it is fixed, or keyed, by the trolley means 56 in the slot 66 against rotation, however, any objectionable frictional resistance is obviated because of the roller mount 64 which supports the platform 55 on the turntable, while it either rotates or while stationary at a vehicle transfer position with respect to a parking cell X.

In this form, the attendant on the platform may have a control unit CU with suitable up and down switch means. The trolley includes brush means 58 and 59 engageable with vertical bus bar means 58a and 59a having leads therefrom to a suitable source of electric power connected at one side of the circuit through leads vertically positioned along the respective uprights of the structure, whereby each track segment is "hot," that is, energized with current to the turntable motor M on the underside of table T.

When the platform 55, with attendant control means CU, is used in the system, the helical track 26, which is preferably formed from curved segments to form the helical track 26, are spaced apart to permit the trolley shaft 63 to pass through the track 26 at each mounting point of each of the track segments along the vertical extent of the slotted upright in which the platform trolley 56 travels.

During the up or down travel of the table T, the operator or attendant platform 55, in FIGS. 4–7, is arranged so that the shaft 66 to the platform 55 from the trolley means in the vertically slotted upright beam will pass through the space formed between the opposed ends of the track segments of track 26.

Thus, when this embodiment is included in the structure, the power supply leads or bus bars are suitably mounted in or on the upright beam with electric lead-in connections to the bus bars on track 26, and the brush means from the motor 40 below the table T engage with the bus bars of the upright beam instead of the bars on the track 26. By placing the electrical connections on or in the adjacent beam members, there is no interference with the power circuit to the motor 40. It is to be understood, however, that it is not necessary to use the attendant platform 55 as the system is arranged for complete remote operation from below or above ground level to the elimination of all car jockeys or any above ground level attendants.

Also, as in elevator ssytems, the travel of the table T is provided at the lower level and upper level portions of the track with suitable safety devices to stop the table at each end of track travel.

VEHICLE TRANSFER MEANS

Figure 10:
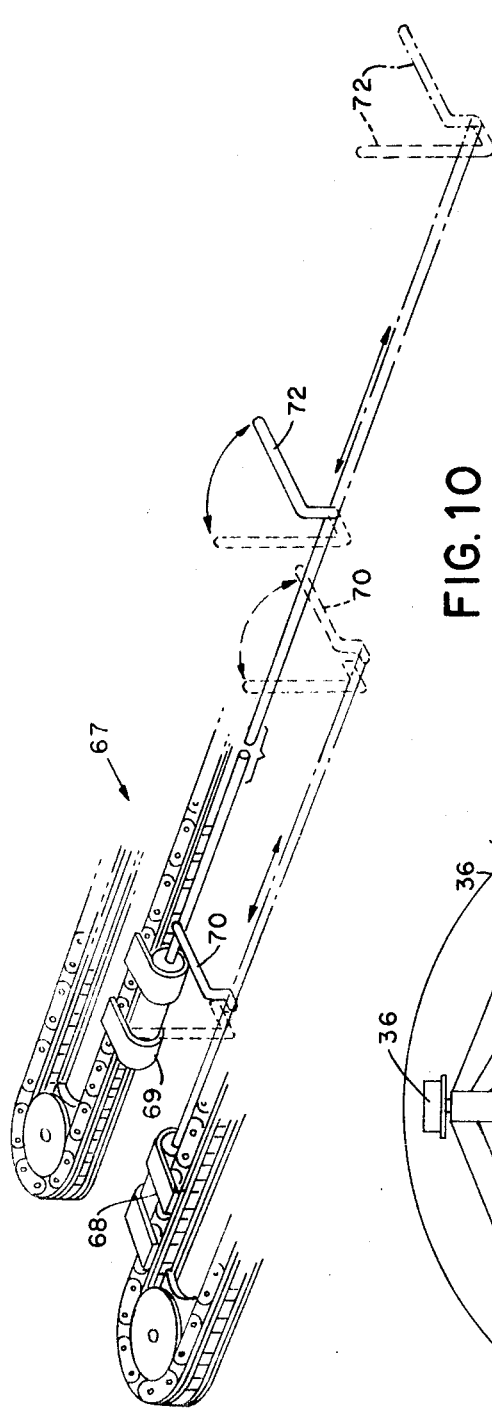
FIG. 10 is a fragmentary showing of one for of turntable vehicle transfer mechanism for moving vehicles to and from the top surface of the turntable at respective parking cell levels.
Figure 11:
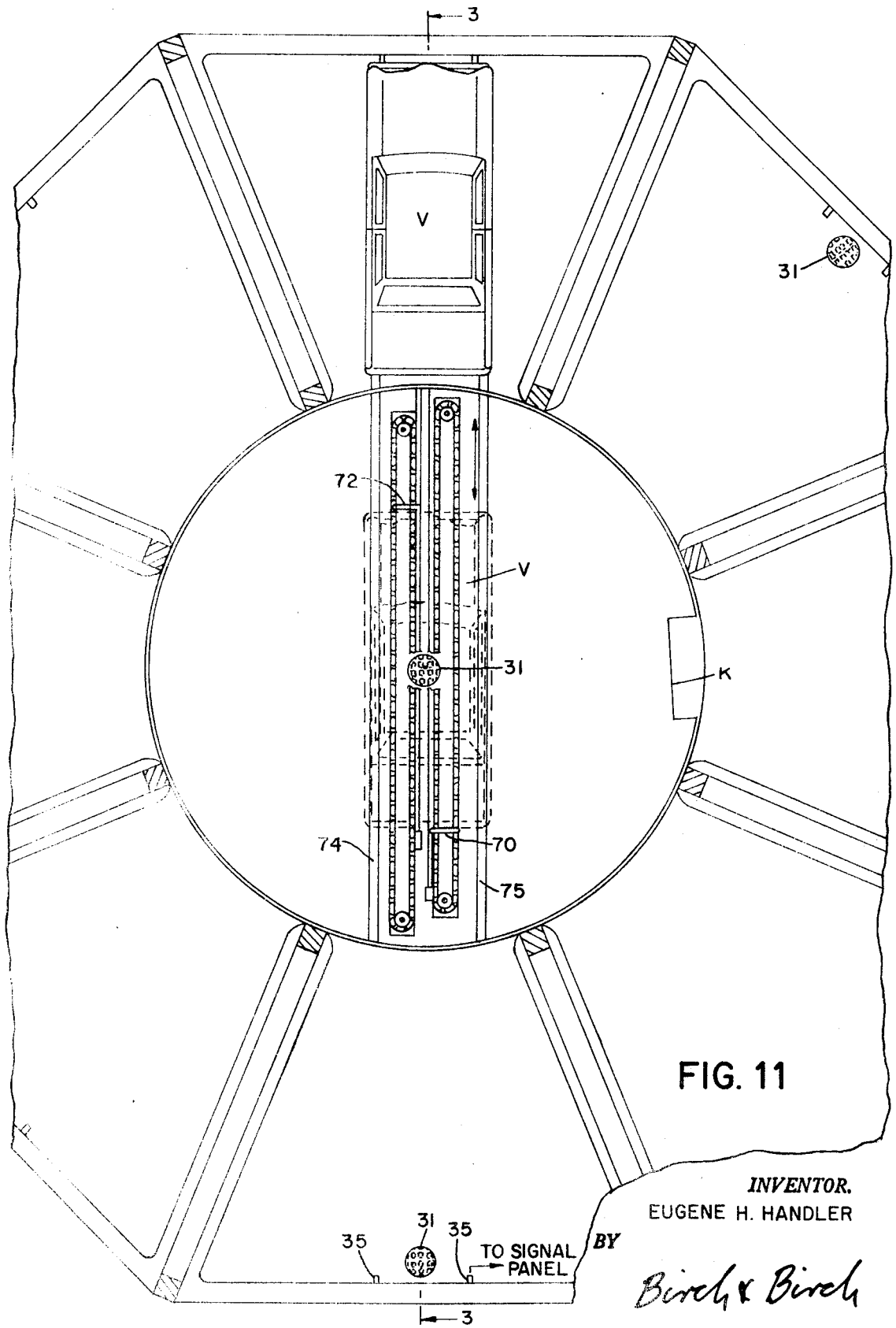
FIG. 11 is a top plan view of the turntable and a form of vehicle transfer means in alignment with a parked vehicle about to be retrieved for delivery to the owner at ground level.

The turntable T, as shown in FIG. 11, has a vehicle transfer unit 67 mounted thereon. This transfer unit 67 may comprise two parallel low-speed rams 68 and 69, electrically, pneumatically or hydraulically operated. One of the ram members is provided with an arm 70 operatively adapted to be raised behind a vehicle V on the turntable, see FIG. 10, and the other ram is provided with an arm 72 operatively adapted to be raised after the ram is projected forward under the vehicle V. The arm 72, ahead of the vehicle, engages the front bumper thereof to draw the vehicle back onto the turntable T for return down the center area D to ground level G. Such arm is so arranged and so proportioned as to not extend beyond the peripheral edge of the table T. Also, during rotation of the turntable T, the respective ram arms 70 and 72 are raised to hold the vehicle V on the turntable. Also, the upper surface of the turntable T is preferably formed with tire well or groove means 74 and 75 to assist in the guiding of the vehicle V to and from the turntable, see FIG. 11.

In reference to FIG. 9, there is illustrated one form of circuitry to an electric motor and a suitable electrical power source. For example, numeral 40 is a reversible motor for driving the turntable wheels and to drive the table to its respective parking positions at each cell. The electric power source to the motor is controlled by the operator who operates the up or down switch means to energize the motor. Prior to pressing the "up" switch with the turntable at ground level G, the vehicle to be elevated and parked is driven onto the table T. The operator then starts the elevator table motor 40 by means of suitable up and down control switch means connected to the motor by the bus bar means 54 mounted along the helical rail, on insulators, and the turntable T begins to climb the spiral track rail 26 to a selected parking cell X. When the turntable is to be returned to lower levels, the down switch is actuated and the motor 40 will reverse direction and drive the same to a lower level or to the ground level, so the vehicle may be driven out of the storage structure by the vehicle's owner or driver. Thus, parking "jockeys," and upper level operators, are eliminated with this embodiment.

OPERATION OF SYSTEM

Generally the operation of the system is believed apparent and any suitable remote control arrangement from ground level G may be provided for the turntable T after a driver stops his vehicle on the center of the table T over the transfer means thereon.

When the driver leaves his car he also leaves the transmission in neutral and the brakes off and the ground operator raises the ram arms 70 and 72 fore and aft of the vehicle. He then starts rotation of the turntable T to raise it into registry with an empty cell X for transfer thereto from the table T by the transfer means.

When an empty parking cell is reached, vertical and directional alignment of the turntable and the cell platform are thus made and the ram arm engaged with the front of the vehicle is lowered and the ram arm engaged with the rear of the vehicle is actuated through the ram to push the same into the aligned parking cell. As the vehicle is pushed into the cell it engages the microswitch members 35 and closes a circuit to the light illuminated chart or panel 38 showing the several parking spaces throughout the structure.

After the car is retrieved by reversing the ram operative arrangement, so as to draw the vehicle back onto the table T by the front ram and arm, the turntable T is then operated by the attendant to return the vehicle to ground level. Upon arrival at the ground level G the ram arms are withdrawn and the driver simply starts the vehicle's engine and drives out frontward from the exits to the street.

What is claimed is:

1. A building structure of geometrical form having a ground level and spiral stepped upper levels comprising a plurality of vertical uprights some of said uprights being outboard of the structure and some inboard thereof, said inboard uprights being spaced apart in a substantial circle to provide an open center area, spirally stepped platforms positioned at stepped levels from the ground level, spaces between the inboard uprights from the said open center area to register selectively with each of said platforms, a spiral track around said open area secured to said inboard uprights, hoist means with an undercarriage having wheels mounted on said track, a platform carried by said undercarriage, power means carried by the hoist adapted to drive said hoist means up and down the said track, said undercarriage and platform being rotatable on said spiral track, said platform having a top surface, and vehicle transfer means carried by the platform for moving a vehicle loaded on the platform onto one of said stepped platforms, and vice versa, in registry therewith, said vehicle transfer means comprising a pair of reversible rams, each having an arm adapted to be raised into contact with the front or rear bumper of a vehicle on the said rotatable platform, the said hoist means platform being formed with peripheral guide slots keyed to the said track, to thereby permit said hoist means platform to revolve as the undercarriage thereof moves up and down the track in said open area of the building structure, and a vertically movable non-rotatable operator platform vertically guided independently of said hoist platform in one of said vertical uprights of the structure, said operator platform having linear guide means auxiliary to said hoist platform guide slots operatively movable with said platform as it travels up and down to different building platform positions, means operatively connecting said operator platform to said carriage and platform and responsive to the movement of said carriage and platform to cause said operator platform to move vertically in said guide means.

2. A building structure as described in claim 1, wherein a control unit is provided on said operator platform for up and down operation of the hoist platform at each of the respective building platform level positions.

3. A building structure as described in claim 1, wherein said outboard and inboard uprights of the said building structure are so spaced and arranged as to form a polygon structure.

References Cited

UNITED STATES PATENTS

| | | | |
|---|---|---|---|
| 3,055,517 | 10/1961 | Kirkland | 214—16.1 |
| 374,442 | 12/1887 | Backman | 187—25 |
| 1,709,914 | 4/1929 | Klanke. | |
| 1,772,110 | 8/1930 | Randle. | |
| 2,428,856 | 10/1947 | Sinclair. | |
| 2,493,493 | 1/1950 | Mariano. | |
| 3,313,427 | 4/1967 | Inuzuka et al. | 214—16.1 |
| 3,419,162 | 12/1968 | Hagel. | |

FOREIGN PATENTS

| | | |
|---|---|---|
| 246,046 | 3/1966 | Austria. |
| 658,022 | 10/1951 | Great Britain. |
| 922,101 | 3/1963 | Great Britain. |
| 991,691 | 5/1965 | Great Britain. |

GERALD M. FORLENZA, Primary Examiner

R. B. JOHNSON, Assistant Examiner

U.S. Cl. X.R.

187—16, 25